Patented May 23, 1939

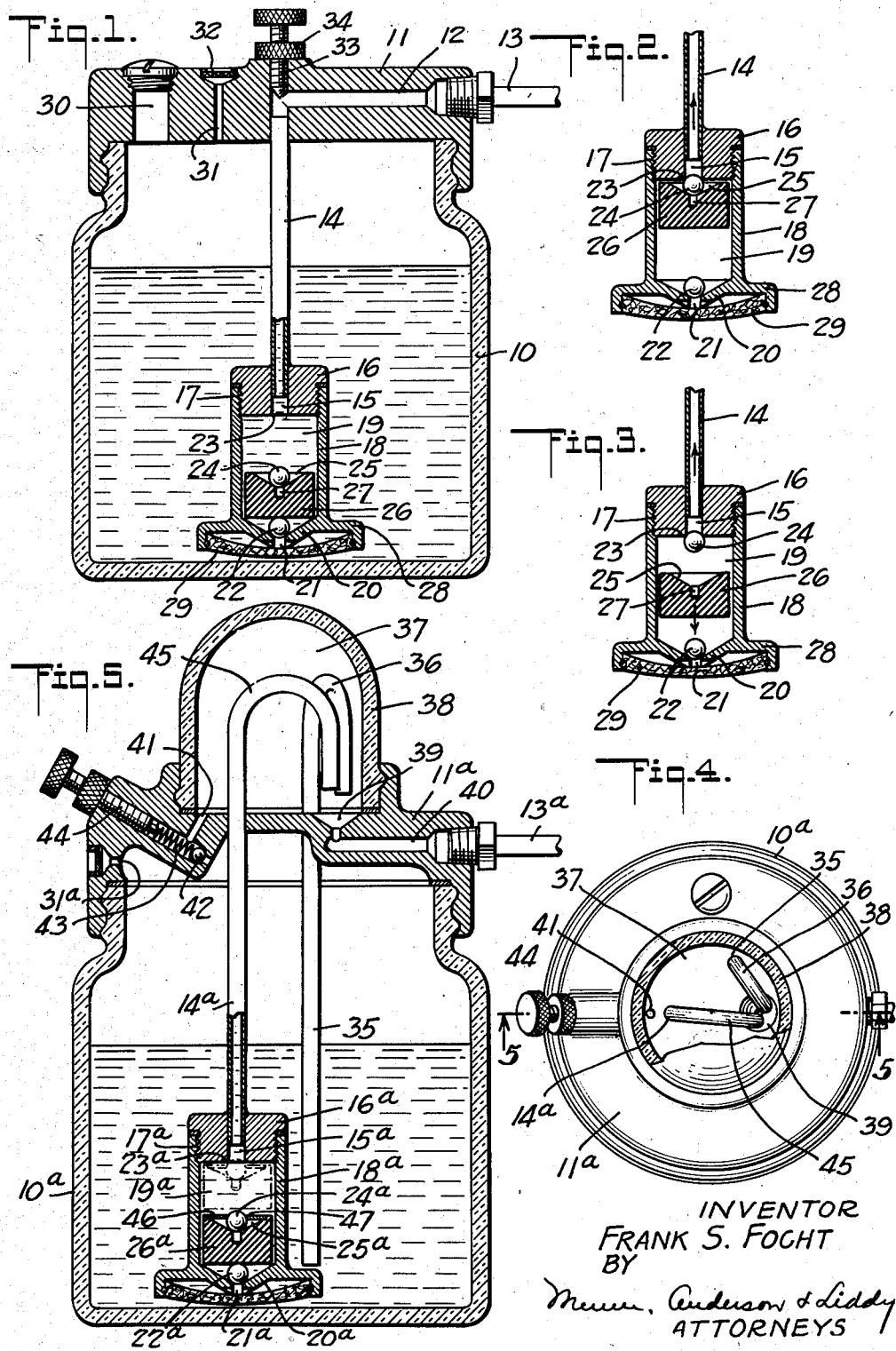

2,159,656

UNITED STATES PATENT OFFICE 2,159,656

LUBRICATOR

Frank S. Focht, Bell, Calif.

Application December 17, 1936, Serial No. 116,394

11 Claims. (Cl. 123—196)

This invention relates generally to lubricators which, in association with an internal combustion engine, function to supply a lubricant to the upper portion of the cylinders, the valves and the valve guides, by introducing the lubricant with the fuel or combustible mixture under the action of engine suction.

An object of this invention is to provide a lubricator by which a predetermined charge of lubricant is caused to be supplied with the fuel to the combustion chambers of the cylinders immediately upon starting the engine, the quantity of the charge being calculated to provide the necessary lubrication so essential to the prevention of excessive wear on the aforestated parts when starting a cold engine.

Another object of the invention is to provide a lubricator of the above described character wherein the charge of lubricant can be supplied in various ways, among which are the following:

1. By accumulating a charge of lubricant during operation of the engine, and in such manner that the size of the charge will increase with the duration of engine operation until a maximum charge of the lubricant has been accumulated for introduction with the fuel to the engine upon the next starting of the engine.

2. By accumulating a charge of lubricant upon stopping the engine, and in such manner that the size of the charge will increase while the motor is at rest until a maximum charge of the lubricant has been accumulated, to the end that until the maximum charge has been accumulated, the size of the charge will be proportionate to the length of time the engine has been at rest, so that the colder the engine the larger the size of the charge which will be introduced to the engine when started, thus insuring the necessary amount of lubricant to prevent excessive wear while providing for an economical use of the lubricant.

A further object of the invention is to provide a device for delivering an excess quantity or charge of lubricant to the engine in the manner above set forth, which can be embodied in an upper cylinder lubricator of the type which supplies lubricant in small quantities to an engine during operation thereof, or which can be constructed as a separate unit delivering a predetermined charge of lubricant to an engine each time it is started.

On the accompanying drawing,

Figure 1 is a view showing in vertical central section one form of lubricator embodying this invention;

Figure 2 and Figure 3 are fragmentary sectional views illustrating different positions of the lubricant charge delivering mechanism embodied in the invention;

Figure 4 is a plan view partly broken away, of a modified form of lubricator embodying the invention;

Figure 5 is a vertical central sectional view taken on the line 5—5 of Figure 4.

Referring specifically to the drawing and particularly to Figures 1 to 3, inclusive, this form of the invention is illustrated as a separate unit by which a predetermined charge of lubricant is adapted to be delivered to the intake of an engine (specifically into its intake manifold) each time the engine is started, and without any feeding of lubricant to the engine during operation thereof following the delivery of the lubricant charge thereto.

This form of the invention, therefore, comprises a lubricant reservoir 10 in the form of a glass jar having a screw-threaded or other form of detachable connection with a cover 11 adapted to be secured to the dash board of an automobile in the engine compartment thereof (not shown) to support the reservoir in a vertical position.

From the horizontal branch of a passage 12 in the cover 11 a suction conduit 13 is adapted to extend and be connected to the intake manifold of the engine (not shown) so that when the engine is in operation suction will be induced in the tube and passage.

In the vertical branch of the passage 12 which extends through the bottom of the cover is fitted a suction tube 14. The lower end of this tube is fitted into the bore 15 of a plug 16 externally threaded at 17 for threaded connection to the upper open end of a cylinder 18, the interior of which provides a chamber 19. At the lowest point of the inclined bottom 20 of the cylinder is an inlet 21 providing communication between the chamber and the reservoir, and in the present instance controlled by a ball check valve or closure 22 which in the operation of the invention prevents the return flow of lubricant from the chamber to the reservoir.

The bore 15 of the plug 16 constitutes an outlet from the chamber 19, and the wall of the bore at its lower end constitutes an annular seat 23 adapted to be engaged by a ball closure 24 to close the outlet.

The ball closure 24 is adapted to rest in a conical depression 25 formed in the top wall of a piston 26 loosely fitting the bore of the cylinder 18 so as to operate in the chamber 19 and to constitute a fluid displacing element. Formed in the piston at the base or apex of the depression 25 is a well or trap 27 in which any foreign particles in the lubricant, which might adversely affect the operation of the closure 24, can collect.

Projecting from the lower end of the cylinder is an annular and cupped flange 28 within which is removably fitted in any suitable manner a filtering pad 29 to exclude foreign particles from the chamber 19. Lubricant is adapted to be supplied to the reservoir through a plug controlled opening 30 in the cover 11, and air is admitted to the reservoir above the lubricant therein through a port 31 in the cover, which is spanned by a screen 32.

A needle valve 33 varying the effective size of the passage 12 is threaded into the cover 11 and is provided with a lock nut 34 by which the valve can be secured, in a selected position of adjustment.

The operation of this form of the invention is as follows:

Following installation of the invention on an automobile and upon the first starting of the engine, the piston 26, which under the action of gravity is disposed at the lower end of the cylinder 19 so as to rest upon the ball closure 22 as shown in Figure 1, is acted upon by the engine suction induced in the chamber 19 from the tube 14 and suction conduit 13 so as to suck the piston upwardly in the chamber to the position shown in Figure 2, thus causing lubricant to be withdrawn from the reservoir 10 through the inlet 21 past the closure 22, and into the chamber to fill the space beneath the piston.

The outlet of the chamber 19 defined by the bore 15 of the plug 16 is now closed by the ball closure 24 and is maintained closed thereby so long as the operation is continued, due to engine suction continuously acting in the tube 14. However, the piston 26 is free to gravitate in the chamber following closing of its outlet by the closure 24 as shown in Figure 3, the rate of movement of the piston being dependent on the flow of lubricant in by-passing between the piston and the wall of the cylinder 18.

The lubricant drawn into the chamber 19 by the piston 26 in its upward movement is confined therein by the closing of the inlet 21 by the ball closure 22, and it is to be understood that the length of time for the piston to gravitate to the bottom of the chamber can be varied by varying the weight of the piston and the clearance between it and the cylinder wall.

Assuming that the engine has been operated for a period of time sufficient for the piston 26 to have gravitated to the bottom of the chamber 19, a maximum quantity of lubricant is disposed in the chamber above or in advance of the piston, and forms the largest charge which can be discharged from the chamber by the piston.

Upon the next starting of the engine, the piston will discharge the charge of lubricant in advance thereof from the chamber through the tube 14 and suction conduit 13 to the engine intake, and will concurrently draw into the chamber through the inlet 21, a quantity of lubricant from the reservoir 10.

No more lubricant will be drawn from the chamber under the action of engine suction during the following operation of the engine, as the ball closure 24 co-acts with its seat 23 to seal the outlet of the chamber so long as operation of the engine is continued. However, the piston is free to gravitate in the chamber at a predetermined rate, and it will be apparent that when the engine is stopped, the ball closure 24 will drop from its seat 23 and again rest in the depression 25 of the piston.

Should the next starting of the engine be effected before a sufficient time interval has elapsed for the piston 26 to gravitate to its lowermost position in the chamber 19, the size of the charge in advance or above the piston, which is caused to be discharged by the latter, will, of course, be less than the maximum charge, and will be in the same proportion to the latter as the actual elapsed time is to the total elapsed time necessary for the maximum quantity of lubricant to be disposed above the piston.

The elapsed time necessary for the piston 26 to gravitate to its lowermost position can be precalculated to approximate a predetermined operating period of the engine, during which the engine oil thins out until the engine reaches its operating temperature. As the need for lubrication of the upper portions of the cylinders and associated parts increases as the oil thins out and thus drains more rapidly from the cylinder walls, the proportionately larger charge of lubricant will be supplied by the lubricator when the next starting of the engine is effected.

It is to be understood that the ball closure 22 is not essential but is desirable as it compensates for variations in the hydrostatic head of lubricant in the reservoir 10 by making the body of lubricant in the chamber independent of the hydrostatic head, and thus enables the time interval during which the piston 26 gravitates from its uppermost extreme position to its lowermost extreme position to be more accurately regulated.

Reference will now be had to Figures 4 and 5 in which a modified form of the invention is shown associated with a lubricator of the sight feed drip type, such as is embodied in U. S. Patent No. 1,814,970, issued July 14, 1931, and which feeds lubricant to the engine in small quantities so long as it is in operation.

This lubricator comprises a reservoir 10a which has detachable connection with a cover 11a through which extends a suction tube 35 to a point adjacent the bottom of the reservoir, and terminates at its upper end in an inverted U-shaped bend 36 disposed within a sight chamber 37 provided by a glass bell 38 on the cover 11a. The outlet of the bend 36 is disposed directly above a well 39 communicating with a passage 40 in the cover, and a suction conduit 13a is adapted to place the passage in communication with the intake manifold of an engine (not shown).

Atmospheric air is supplied to the reservoir 10a through a screen port 31a in the cover, and a duct 41 places the sight chamber 37 in communication with the reservoir under the control of a ball valve 42 urged to closed position by a spring 43 the loading of which can be varied by an adjusting screw 44, all for the purpose of insuring a uniform feed of lubricant irrespective of variations in the degree of vacuum induced by the engine, as will be understood by those familiar with the art.

The form of the invention which is associated with the drip or constant feed type of lubricator above described comprises a suction tube 14a extending through the cover 11a with its upper end terminating in a return bend 45 disposed to also discharge lubricant into the well 39, and with its lower end fitted into the bore 15a of a plug 16a externally threaded at 17a for threaded connection to the upper open end of a cylinder 18a the interior of which provides a chamber 19a. At the lowest point of the inclined bottom 20a of the cylinder is an inlet 21a providing a communication between the chamber 19a and the reservoir 10a. In the present instance, the inlet 21a is controlled by a ball check valve or closure 22a which functions in the same manner as the closure 22 of the first described form of the invention.

The bore 15a of the plug 16a constitutes an outlet from the chamber 19a and defines an annular seat 23a adapted to be engaged by a ball closure 24a to close the outlet. The closure 24a rests in a conical depression 25a in the top wall of a piston 26a loosely fitting the bore of the cylinder 18a to function similarly to the previously described piston 26.

However, in this instance, the closure 24a is permanently associated with the piston by a retaining disk 46 fixed to the piston and having an aperture 47 loosely receiving the upper portion of the closure 24a to enable the latter to coact with its seat 23a.

This form of the invention differs in operation from the form first described only in that following the discharge of lubrication from the chamber 19a by the piston 26a, the latter is held in its uppermost position shown in broken lines in Figure 5 so long as the operation of the engine is continued, as the closure 24a is permanently associated with the piston and maintains the outlet of the chamber closed by the action of the engine suction.

However, when operation of the engine is discontinued, the piston 26a and closure 24a will be free to gravitate as a unit in the chamber 19a. Thus lubricant to form the next charge will only begin to accumulate in advance or above the piston 26a upon stopping the engine and will increase in quantity until the maximum charge has been accumulated. Therefore, the size of the charge will be in proportion to the length of time the engine has been at rest, the cooling of the engine during the period of rest being compensated for by the increase in the size of the charge until the maximum is reached when the piston occupies its lowermost positon in the chamber 19a.

What is claimed is:

1. A lubricator comprising a lubricant reservoir; means for receiving lubricant from the reservoir and adapted for conection to an engine intake so as to be subjected to suction created by the engine when in operation; means responsive to suction created by the engine when started, to discharge a body of lubricant from the first means for delivery to the engine intake; means for preventing further discharge of lubricant from the first means so long as the first means is subjected to engine suction; and means for varying the amount of lubricant to be discharged from the first means in accordance with the lapse of time following starting of the engine, until a sufficient length of time has elapsed for a predetermined maximum quantity of lubricant to be accumulated.

2. A lubricator comprising a lubricant reservoir; means for receiving lubricant from the reservoir and adapted for connection to an engine intake so as to be subjected to suction created by the engine when in operation; means responsive to suction created by the engine when started, to discharge a body of lubricant from the first means for delivery to the engine intake; and means for controlling the quantity of lubricant to be discharged, by accumulating lubricant as time elapses following the starting of the engine, until a predetermined maximum quantity has been accumulated, whereby the quantity of lubricant discharged upon the next starting of the engine will be dependent upon the length of time during which the engine has been in operation within the maximum time interval necessary for said predetermined maximum quantity of lubricant to be accumulated.

3. A lubricator comprising a lubricant reservoir; a cylinder having an inlet communicating with the reservoir; and an outlet adapted for connection to an engine intake to subject the cylinder to suction created by the engine when in operation; a piston in the cylinder responsive to engine suction to withdraw lubricant from the reservoir through said inlet into the cylinder and discharge lubricant from the cylinder through said outlet; and suction responsive means coacting with the piston and outlet to close the latter following the discharge of lubricant from the cylinder while permitting the piston to gravitate in the cylinder.

4. A lubricator comprising a lubricant reservoir; a cylinder having an inlet communicating with the reservoir and an outlet adapted for connection to an engine intake to subject the cylinder to suction created by the engine when in operation; a piston in the cylinder responsive to engine suction to withdraw lubricant from the reservoir through said inlet into the cylinder and discharge lubricant from the cylinder through said outlet; and a closure carried by the piston for closing said outlet following the discharge of lubricant from the cylinder and so long as the latter is subjected to suction; the closure being free of the piston so as to maintain the outlet closed while permitting the piston to gravitate in the cylinder by displacing of lubricant from one side of the piston to the other.

5. A lubricator comprising a lubricant reservoir; a cylinder having an inlet communicating with the reservoir, and an outlet adapted for connection to an engine intake to subject the cylinder to suction created by the engine when in operation; a piston in the cylinder responsive to engine suction to withdraw lubricant from the reservoir through said inlet into the cylinder and discharge lubricant from the cylinder through said outlet; and a closure carried by the piston for closing said outlet following the discharge of lubricant from the cylinder and so long as the latter is subjected to suction; the closure being connected to the piston so as to maintain the piston in an elevated position from which the piston and closure will be free to gravitate in the cylinder when suction at the outlet ceases, by displacing of lubricant from one side of the piston to the other.

6. A lubricator comprising a lubricant reservoir; a cylinder having an inlet communicating with the reservoir, and an outlet adapted for connection to an engine intake to subject the cylinder to suction created by the engine when in operation; a piston in the cylinder responsive to engine suction to withdraw lubricant from the reservoir through said inlet into the cylinder and discharge lubricant from the cylinder through said outlet; and a ball closure carried by the piston to close the outlet following the discharge of lubricant from the cylinder; the piston having a centering depression in which the ball closure rests and is maintained in a position for closing co-action with outlet.

7. A lubricator comprising a lubricant reservoir; a cylinder having an inlet communicating with the reservoir, and an outlet adapted for connection to an engine intake to subject the cylinder to suction created by the engine when in operation; a piston in the cylinder responsive to engine suction to withdraw lubricant from the reservoir through said inlet into the cylinder and discharge lubricant from the cylinder through said outlet; and a ball closure carried by the piston to close the outlet following the discharge of lubricant from the cylinder; the piston having a centering depression in which the ball closure rests and is maintained in a position for closing co-action with the outlet; the piston having a sediment trap communicating with the base of said depression.

8. A lubricator comprising a lubricant reservoir; a cylinder having an inlet communicating with the reservoir, and an outlet adapted for connection to an engine intake to subject the cylinder to suction created by the engine when in operation; a piston in the cylinder responsive to engine suction to withdraw lubricant from the reservoir through said inlet into the cylinder and discharge lubricant from the cylinder through said outlet; a ball closure carried by the piston to close the outlet following the discharge of lubricant from the cylinder; the piston having a centering depression in which the ball closure rests and is maintained in a position for closing co-action with the outlet; and a retainer for said closure secured to the piston and having an aperture freely receiving a portion of the closure.

9. A lubricator comprising a lubricant reservoir; a cylinder having an inlet communicating with the reservoir and an outlet adapted for connection to an engine intake to subject the cylinder to suction created by the engine when in operation; a piston in the cylinder responsive to engine suction to withdraw lubricant from the reservoir through said inlet into the cylinder and discharge lubricant from the cylinder through said oulet; and means independent of the piston, for closing said outlet following the discharge of lubricant from the cylinder, and so long as the latter is subjected to suction.

10. A lubricator comprising a lubricant reservoir; a cylinder having an inlet communicating with the reservoir and an outlet adapted for connection to an engine intake to subject the cylinder to suction created by the engine when in operation; a piston in the cylinder responsive to engine suction to withdraw lubricant from the reservoir through said inlet into the cylinder and discharge lubricant from the cylinder through said outlet; and means for closing said outlet following the discharge of lubricant from the cylinder and so long as the latter is subjected to suction; said means being associated with the piston to enable the latter to gravitate in the cylinder following discharge of lubricant therefrom af aforestated.

11. A lubricator comprising a lubricant reservoir; a cylinder having an inlet communicating with the reservoir and an outlet adapted for connection to an engine intake to subject the cylinder to suction created by the engine when in operation; a piston in the cylinder responsive to engine suction to withdraw lubricant from the reservoir through said inlet into the cylinder and discharge lubricant from the cylinder through said outlet; and means actuated by the piston to close said outlet following the discharge of lubricant from the cylinder, and enabling the piston to gravitate in the cylinder when the outlet is closed.

FRANK S. FOCHT.